(12) United States Patent
Taniguchi et al.

(10) Patent No.: US 11,722,397 B2
(45) Date of Patent: Aug. 8, 2023

(54) RELIABILITY ESTIMATION SYSTEM AND RELIABILITY ESTIMATION METHOD

(71) Applicant: NIPPON TELEGRAPH AND TELEPHONE CORPORATION, Tokyo (JP)

(72) Inventors: Atsushi Taniguchi, Musashino (JP); Takeru Inoue, Musashino (JP); Kohei Mizuno, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/596,212

(22) PCT Filed: Jun. 26, 2019

(86) PCT No.: PCT/JP2019/025483
§ 371 (c)(1),
(2) Date: Dec. 6, 2021

(87) PCT Pub. No.: WO2020/261452
PCT Pub. Date: Dec. 30, 2020

(65) Prior Publication Data
US 2022/0321447 A1    Oct. 6, 2022

(51) Int. Cl.
*G06F 15/173* (2006.01)
*H04L 43/55* (2022.01)
(Continued)

(52) U.S. Cl.
CPC .............. *H04L 43/55* (2022.05); *H04L 12/28* (2013.01); *H04L 41/145* (2013.01); *H04L 47/2491* (2013.01)

(58) Field of Classification Search
CPC ... H04L 43/55; H04L 47/2491; H04L 41/145; H04L 12/28
See application file for complete search history.

(56) References Cited

U.S. PATENT DOCUMENTS

2022/0321447 A1* 10/2022 Taniguchi ............... H04L 12/28

FOREIGN PATENT DOCUMENTS

| CN | 105449676 A | * | 3/2016 |
| CN | 206685608 U | * | 11/2017 |

(Continued)

OTHER PUBLICATIONS

G. Hardy, C. Lucet, and N. Limnios, "K-Terminal Network Reliability Measures With Binary Decision Diagrams" IEEE Transactions on Reliability, vol. 56, No. 3, pp. 506-515 (2007).
(Continued)

*Primary Examiner* — Richard G Keehn
(74) *Attorney, Agent, or Firm* — Harness, Dickey & Pierce, P.L.C.

(57) ABSTRACT

Provided are a reliability estimation system and a reliability estimation method capable of reducing a calculation amount of a reliability of a plurality of networks between terminals in communication between the terminals over the plurality of networks. The reliability estimation system according to the present invention calculates, for each network, a contraction reliability $R_x$, a contraction reliability $R_x'$ when nodes are contracted, and a contraction reliability $R_B'$ between the networks including the terminals, and a true value of the reliability between the terminals over the plurality of networks is between a product P1 ($=R_B' R_x$) and a product P2 ($=R_B' R_x'$). Instead of calculating the true value of the reliability, only an upper limit and a lower limit are calculated, and thus, it is possible to significantly low additional remark the calculation amount.

10 Claims, 10 Drawing Sheets

(51) Int. Cl.
*H04L 47/2491* (2022.01)
*H04L 12/28* (2006.01)
*H04L 41/14* (2022.01)

(56) References Cited

FOREIGN PATENT DOCUMENTS

| CN | 207612262 U | * | 7/2018 | |
|---|---|---|---|---|
| CN | 108346545 B | * | 6/2019 | ........... H01H 31/023 |
| JP | 2005341050 A | * | 12/2005 | |

OTHER PUBLICATIONS

K. Sekine, H. Imai and S. Tani, "Computing the Tutte Polynomial of a Graph of Moderate Size", Proc. 6th International Symposium on Algorithms and Computation, pp. 224-233 (1995).

* cited by examiner

|  | EXISTING METHOD | METHOD OF PRESENT EMBODIMENT |
|---|---|---|
|  | ACTUAL CALCULATION OF RELIABILITY WITH COUPLING PROBABILITY | CALCULATION OF RELIABILITY RANGE |
| DYNAMIC PATH CALCULATION | APPLICABLE | APPLICABLE |
| CALCULATION AMOUNT | INCREASE EXPONENTIALLY WITH TOTAL NUMBER OF LINKS | INCREASE PROPORTIONALLY TO NUMBER OF DOMAINS |
| EXCHANGE OF TOPOLOGY INFORMATION | REQUIRED | NOT REQUIRED |

Fig. 2

RELIABILITY ESTIMATION SYSTEM AND RELIABILITY ESTIMATION METHOD

CROSS-REFERENCE TO RELATED APPLICATIONS

This application is a 371 U.S. National Phase of International Application No. PCT/JP2019/025483 filed on Jun. 26, 2019. The entire disclosure of the above application is incorporated herein by reference.

TECHNICAL FIELD

The present disclosure relates to a reliability estimation system for calculating a network reliability and a method thereof.

BACKGROUND ART

In recent years, with the development of applications and the like based on high reliability, such as applications for remote medical care and autonomous driving, demands for a reliability of networks between terminals executing these applications are increasing. A large number of methods for evaluating a reliability of networks between terminals have been studied. When the network size increases, the calculation amount increases exponentially, which is known as NP-hardness. Several methods for reducing the calculation amount in reliability evaluation have been proposed (see, for example, NPLs 1 and 2).

CITATION LIST

Non Patent Literature

NPL 1: G. Hardy, C. Lucet, and N Limnios, "K-Terminal Network Reliability Measures With Binary Decision Diagrams" IEEE TRANSACTIONS ON RELIABILITY, VOL. 56, NO. 3, pp. 506-515 (2007)

NPL 2: K. Sekine, H. Imai and S. Tani, "Computing the Tutte Polynomial of a Graph of Moderate Size", Proc. 6th International Symposium on Algorithms and Computation, pp. 224-233 (1995)

SUMMARY OF THE INVENTION

Technical Problem

In large networks, communication is rarely completed within a single network and is typically performed via a plurality of management domain networks. Thus, as more networks are involved, the network size is too large to calculate a reliability of the networks between terminals so that the calculation amount is very large, and thus, there is a problem in that the calculation is difficult.

Thus, in order to solve the above-described problem, an object of the present invention is to provide a reliability estimation system and a reliability estimation method capable of reducing a calculation amount of a reliability of a plurality of networks between terminals in communication between the terminals over the plurality of networks.

Means for Solving the Problem

In order to achieve the above object, in a reliability estimation system and a reliability estimation method according to the present invention, an exact reliability R of a network is not calculated, but a lower limit value and an upper limit value of the reliability R is calculated to estimate (a range of the reliability R) having the reliability R between the lower limit value and the upper limit value.

Specifically, a reliability estimation system according to the present invention is a reliability estimation system for estimating a reliability of communication between terminals in different networks, the system includes
an intra-network reliability calculation unit and an inter-network reliability calculation unit, wherein when the communication involves two or more paths passing through a plurality of networks,
the intra-network reliability calculation unit
calculates a non-contraction reliability $R_x$ within a network for each of the plurality of networks, and calculates a contraction reliability $R_x'$ within a network when nodes are contracted in the network in which paths are separated and merged, among the plurality of networks, and
the inter-network reliability calculation unit
calculates a contraction reliability $R_B'$ between the networks including the terminals when nodes are contracted in the networks including the terminals, among the plurality of networks, receives, from the intra-network reliability calculation unit, the non-contraction reliability $R_x$ and the contraction reliability $R_x'$ to calculate a product P1 of the contraction reliability $R_B'$ and all of the non-contraction reliabilities $R_x$ and to calculate a product P2 of the contraction reliability $R_B'$ and all of the contraction reliabilities $R_x'$.

Furthermore, a reliability estimation method according to the present invention is a reliability estimation method for estimating a reliability of communication between terminals in different networks, and
is characterized in that, the method includes
when the communication involves two or more paths passing through a plurality of networks, calculating a non-contraction reliability $R_x$ within a network for each of the plurality of networks,
calculating a contraction reliability $R_x'$ within a network when nodes are contracted in the network in which paths are separated and merged, among the plurality of networks,
calculating a contraction reliability $R_B'$ between the networks including the terminals when nodes are contracted in the networks including the terminals, among the plurality of networks,
calculating a product P1 of the contraction reliability $R_B'$ and all the plurality of non-contraction reliabilities $R_x$ and a product P2 of the contraction reliability $R_B'$ and all the plurality of contraction reliabilities $R_x'$, and
estimating that a true value of the reliability of communication between the terminals is between the product P1 and the product P2.

In the present reliability estimation system and the present reliability estimation method, the contraction reliability $R_x$, the contraction reliability $R_x'$ when nodes are contracted, and the contraction reliability $R_B'$ between the networks including the terminals are calculated for each network, and it is estimated that a true value of the reliability between the terminals over the plurality of networks is between the product P1 (=$R_B' \Sigma R_x$) and the product P2 (=$R_B' \Sigma R_x'$). Instead of calculating the true value of the reliability, only an upper limit and a lower limit are calculated, and thus, it is possible to significantly reduce the calculation amount.

Consequently, the present invention can provide a reliability estimation system and a reliability estimation method capable of reducing a calculation amount of a reliability of a plurality of networks between terminals in communication between the terminals over the plurality of networks.

The reliability estimation system according to the present invention is characterized in further including a control unit causes the intra-network reliability calculation unit and the inter-network reliability calculation unit to calculate the product P1 and the product P2, and sets a size of a buffer satisfying a required quality of an application to a node on a path of the application.

Normally, in a case where real time communication is required, the reliability of a line is unknown, and thus, a surplus of buffer is provided. However, when the buffer is increased, a delay increases. Thus, the present reliability estimation system changes a buffer of an application, recalculates a network reliability, and optimizes the buffer amount to a level that satisfies a required quality of the application.

The reliability estimation system according to the present invention is characterized in further including a control unit, when none of the paths satisfies a required quality of an application, sets a path for the application which is obtained by redundantly combining a plurality of the paths. When the required quality of the application is not satisfied, the present reliability estimation system redundantly designs the paths, recalculates the network reliability, and determines whether the required quality of the application is satisfied.

The reliability estimation system according to the present invention is characterized in further including a control unit, when none of the paths satisfies a required quality of an application, increases a size of a buffer on the paths; and sets a path for the application which is satisfying the required quality of the application among the paths. When the required quality of the application is not satisfied, the present reliability estimation system increases the buffer, recalculates the network reliability, and determines whether the required quality of the application is satisfied.

The reliability estimation system according to the present invention is characterized in further including a control unit, wherein
the intra-network reliability calculation unit further calculates at least one of a delay, a fee, and a utilization rate within a network for each state of the plurality of networks,
the inter-network reliability calculation unit further calculates at least one of a delay, a fee, and a utilization rate between the plurality of networks, and calculates a delay, a fee, and a utilization rate between the terminals in combination with the result calculated by the intra-network reliability calculation unit, and
the control unit determines whether the delay, the fee, and the utilization rate between the terminals satisfy a predetermined required value.

Effects of the Invention

The present invention can provide a reliability estimation system and a reliability estimation method capable of reducing a calculation amount of a reliability of a plurality of networks between terminals in communication between the terminals over the plurality of networks.

BRIEF DESCRIPTION OF DRAWINGS

FIG. 2 is a table for comparing the reliability estimation system according to the present invention with the known art.

DESCRIPTION OF EMBODIMENTS

Embodiments of the present invention will be described with reference to the accompanying drawings. The embodiments described below are examples of the present invention and the present invention is not limited to the embodiments described below. Note that components with the same reference signs in the specification and the drawings are assumed to be the same components.

First Embodiment

Figure 1:
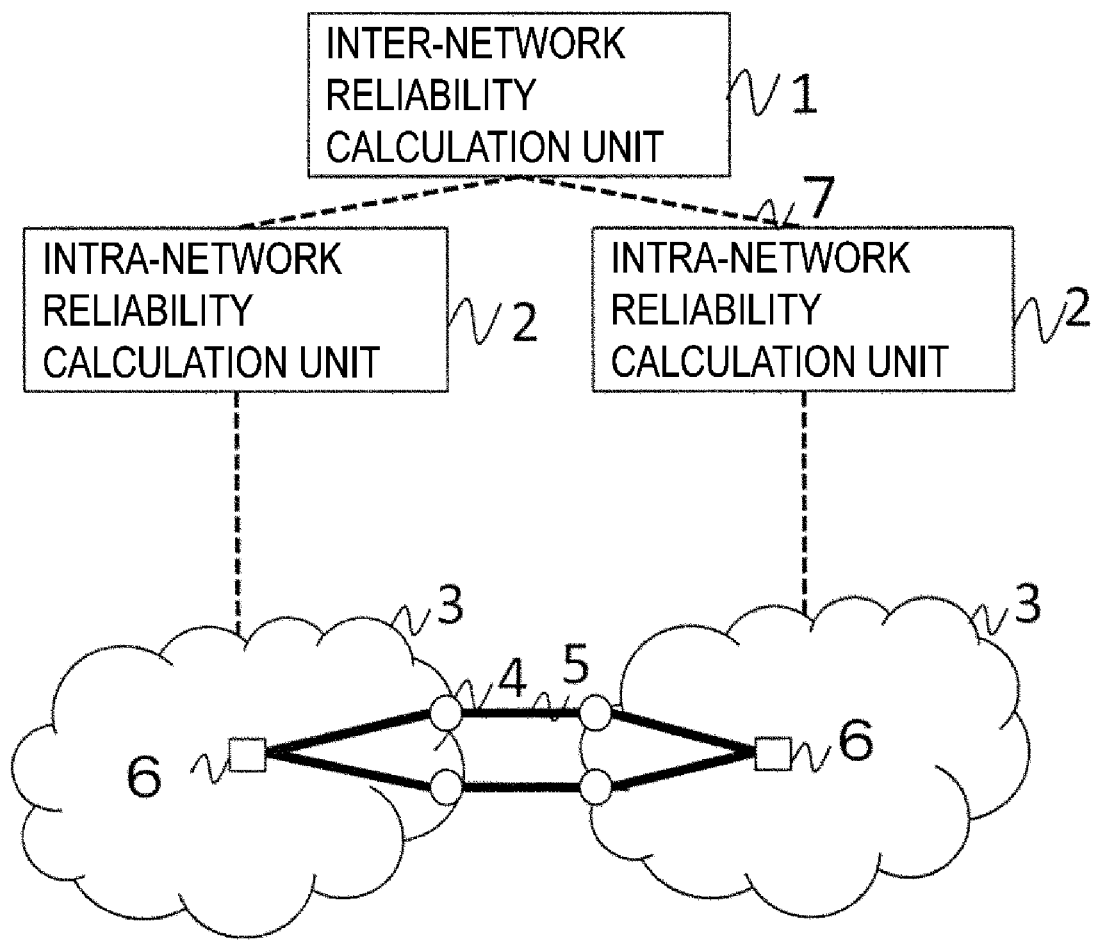
FIG. 1 is a diagram for describing a reliability estimation system according to the present invention.

FIG. 1 is a diagram for describing a configuration of a network reliability estimation system 301 of the present embodiment. The reliability estimation system 301 is a reliability estimation system for estimating a reliability of communication between terminals 6 in different networks 3, includes intra-network reliability calculation units 2 and an inter-network reliability calculation unit 1,
and is characterized in that, when the communication involves two or more paths passing through a plurality of the networks 3, each of the intra-network reliability calculation units 2 calculates a non-contraction reliability $R_x$ within a network for each of the plurality of networks 3, and
calculates a contraction reliability $R_x'$ within a network when nodes are contracted in the network in which the paths are separated and merged, among the plurality of networks 3, the inter-network reliability calculation unit 1
calculates a contraction reliability $R_B'$ between the networks including the terminals 6 when nodes are contracted in the networks including the terminals 6, among the plurality of networks 3,
receives, from the intra-network reliability calculation unit 2, the non-contraction reliability $R_x$ and the contraction reliability $R_x'$, and calculates a product P1 of the contraction reliability $R_B'$ and all the non-contraction reliabilities $R_x$ and a product P2 of the contraction reliability $R_B'$ and all the contraction reliabilities $R_x'$.

The terminals 6 are disposed in the networks 3 different from each other, and the terminals 6 are connected via a link 5 to adjacent nodes 4 connecting the networks 3. The link 5 between the networks 3 may be wireless or wired. Each of the nodes 4 may be a router, a server, or a transmission device.

It is assumed that a service provider estimates a reliability of a network and a network provider provides a network.

The service provider provides the inter-network reliability calculation unit 1. The network provider provides the networks 3 and the intra-network reliability calculation unit 2. Each of the calculation units may be implemented as software or hardware in a computer.

Theory

A method of calculating a network reliability between terminals will be described below. The network is given by a graph G below.

[Math. 1]

$$G = (V, E) \quad (1)$$

V is a node, E is a link, B is an adjacent node, and T is a terminal or a node to which a terminal is connected. D is the number of networks and $g[V_i]$ is a set of subgraphs of a network i.

First, a case where networks are connected by a pair of adjacent nodes is considered. All subgraphs connecting terminals pass through the adjacent nodes, and thus, the following relationship between a graph g and a network reliability R is established.

[Math. 2]

$$g(G,T) = g(G, T \cup B)$$
$$R(G,T) = R(G, T \cup B) \quad (2)$$

Furthermore, a link E between endpoints can be conceptually divided into a graph G[V] within the network and a graph G[B] between the networks.

[Math. 3]

$$E(G\,|\,[B]) \cup \bigcup_{i \in D} E(G[V_i]) = E \quad (3)$$

$$E(G[V_i]) \cap E(G[V_j]) = 0 \; i, j \in D (i \neq j)$$

$$E(G[V_i]) \cap E(G[B]) = 0 \; i \in D$$

In the subgraphs between the networks, all the adjacent nodes are connected, and in the subgraphs within the network, a terminal always is connected to a terminal and an adjacent node, so that from the equations (3), a subgraph $g(G, T \cup B)$ and the network reliability $R(G, T \cup B)$ are given by the following equations.

[Math. 4]

$$g(G, T \cup B) = g(G[B]), B) \prod_{i \in D} g(G[V_i], (T \cup B) \cap V_i) \quad (4)$$

$$R(G, T \cup B) = R(G[B], B) \prod_{i \in D} R(G[V_i], (T \cup B) \cap V_i)$$

Next, a case where a plurality of adjacent nodes connect networks is described. It is only required that the subgraph g passes through any of the adjacent nodes, and thus, the graph is given by the following expression.

[Math. 5]

$$g(G,T) \supseteq g(G, T \cup B) \quad (5)$$

Figure 7:
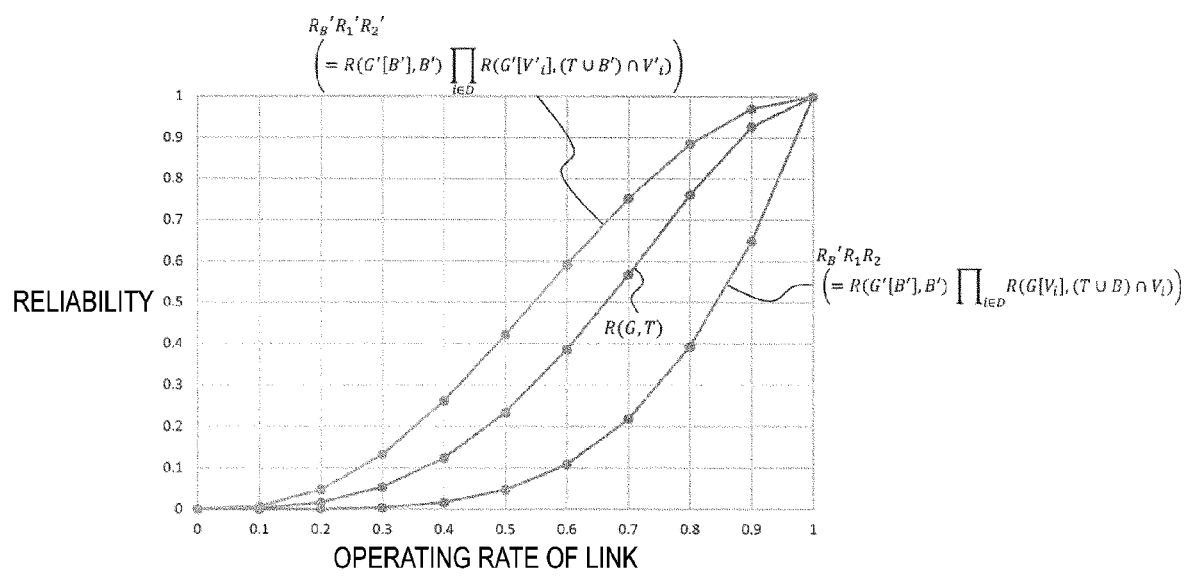
FIG. 7 is a graph for describing an evaluation result of a network reliability calculated by the reliability estimation system according to the present invention.

A contraction process of adjacent nodes is a process of combining a plurality of adjacent nodes into one adjacent node when there are the plurality of adjacent nodes in a network (see FIG. 7). In the contraction process, when $f_V$ is a function for contracting adjacent nodes, and $f_E$ is a mapping for contracting links, a graph G' in which the adjacent nodes are contracted is expressed by the following expression.

[Math. 6]

$$G' = (V', E') \quad (6)$$

$$f_V : V \to V'$$

$$f_E : E \to E(G', [B']) \cup \bigcup_{i \in D} E(G'[V'])$$

It is only required that contracted adjacent nodes are connected in the subgraphs between the networks, and that a subgraph within the network is always connected to any one of the adjacent nodes, and thus, from the expressions (6), the subgraph $g(G, T \cup B)$ satisfies the following expression.

[Math. 7]

$$g(G, T \cup B) \supseteq g(G'^{[B']}, B') \sqcup \coprod_{i \in D} g(G[V_i]), (T \cup B) \cap V_i \quad (7)$$

The subgraphs are mutually exclusive and have a positive probability, and thus, the following expression is established from expressions (5) and (7) according to the above inclusion relation.

[Math. 8]

$$R(G, T) \geq R(G'^{[B']}, B') \prod_{i \in D} R(G[V_i]), (T \cup B) \cap V_i \quad (8)$$

Also, a path being present in G is also always present in G', and thus, the following expression is established.

[Math. 9]

$$g(G,T) \subseteq g(G',T) \quad (9)$$

Furthermore, when adjacent nodes are contracted, the following equation is established from expression (5).

[Math. 10]

$$g(G', T) = g(G'^{[B']}, B') \sqcup \coprod_{i \in D} g(G'^{[V'_i]}), (T \cup B') \cap V'_i \quad (10)$$

From expression (9) and equation (10), the following expression is established.

[Math. 11]

$$R(G, T) \leq R(G'^{[B']}, B') \prod_{i \in D} R(G'[V'_i]), (T \cup B') \cap V'_i \quad (11)$$

From expression (8) and expression (11), a range of the reliability R(G, T) of a network through which terminals are connected is expressed by the following expression.

[Math. 12]

$$R(G'[B'], B') \prod_{i \in D} R(G[V_i], (T \cup B) \cap V_i) \leq \qquad (12)$$

$$R(G'[B'], B') \prod_{i \in D} R(G'[V'_i], (T \cup B') \cap V'_i)$$

wherein $R(G'[B'], B')$ denotes a reliability between the networks when the adjacent nodes are contracted, $R(G[V_i], (T \cup B) \cap V_i)$ denotes a reliability within a network, and $R(G'[V'_i], (T \cup B') \cap V'_i)$ denotes a reliability within the network when the adjacent nodes are contracted. The left side of expression (12) represents the product P1, and the right side represents the product P2.

FIG. 2 is a table for comparing the characteristics of the reliability estimation (reliability range calculation) method of the present embodiment with the characteristics of the reliability estimation method (an existing method) described in NPLs 1 and 2.

The existing method directly calculates the reliability of the entire target networks including a plurality of domains. The calculation amount for determining the reliability increases exponentially according to the total number of links included in each of the networks. The exact reliability is achieved by the existing method, but the calculation amount is very large, and thus, the calculation may not be completed within a practical time (see the above reference documents for a specific calculation method).

On the other hand, in the reliability estimation method of the present embodiment, the reliability of networks between terminals is divided into reliabilities of each of the networks for calculation and uses the calculated reliability within each of the networks to estimate the reliability. The calculation amount in the reliability estimation method of the present embodiment increases in proportion to the number of domains. Thus, the reliability estimation method of the present embodiment can significantly reduce the calculation amount compared to the existing methods.

Furthermore, in the reliability estimation method of the present embodiment, the network provider calculates the reliability within each of the networks and provides the calculation result to the service provider, and thus, there is no risk that topology information in the network leaks to the service provider. Also, if the network provider encrypts the calculation result to provide the encrypted result to the service provider and the service provider calculates the encrypted result, there is no risk that the reliability of the network leaks to the service provider.

Figure 3:
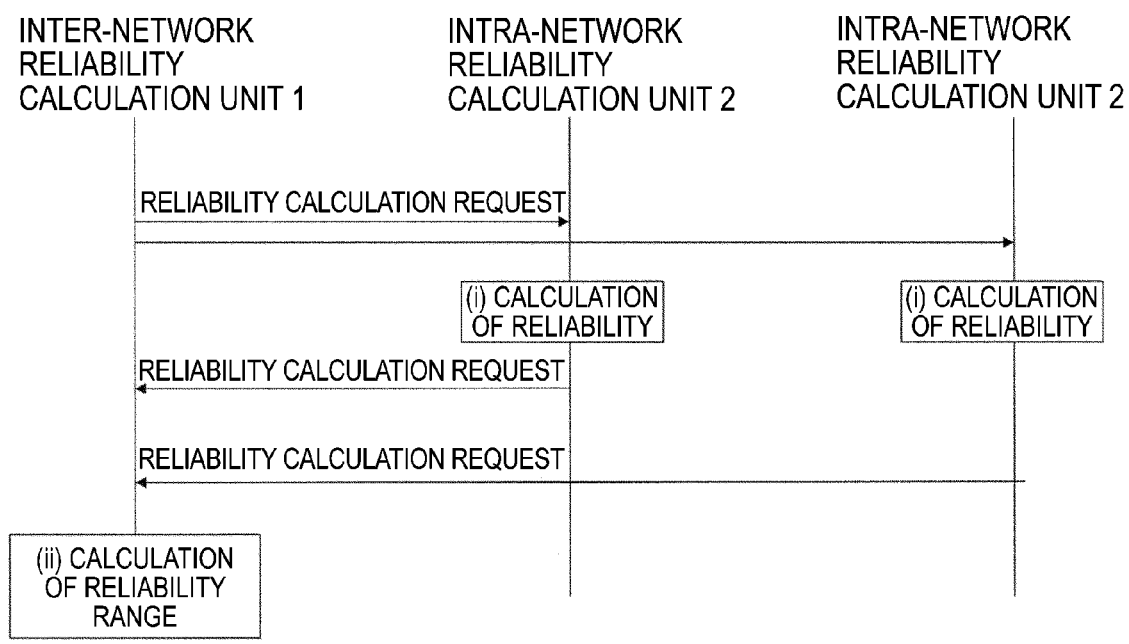
FIG. 3 is a sequence diagram for describing an operation of the reliability estimation system according to the present invention.

FIG. 3 is a diagram for describing an example of a sequence when a reliability range of a network between terminals of the present embodiment is calculated.

From information about a terminal for which the reliability is to be evaluated and a domain in which the terminal is disposed, the inter-network reliability calculation unit 1 transmits a reliability calculation request to the intra-network reliability calculation unit 2 of the corresponding domain.

Each of the intra-network reliability calculation units 2 calculates the reliability of the network between the terminal and the adjacent node from a combination of a node and a link of the network and an operating rate of the link and the node (note that the graph G of the network includes the link, the operating rate of the link, the operating rate of the node, and a topology configuration). Subsequently, each of the intra-network reliability calculation units 2 performs a contraction process of the adjacent nodes and calculates the reliability in the network between the terminal and the adjacent node. A method of calculating the reliability of the network between the terminal and the adjacent node uses, for example, an existing method of calculating a reliability of a network, as described in NPLs 1 and 2. In this method, probabilities of realizing a state in which a terminal and an adjacent node are coupled are calculated, and the sum of the probabilities is the reliability of the network, and thus, the reliability of the network is calculated using the probability that the terminal and the adjacent node are connected.

Next, each of the intra-network reliability calculation units 2 transmits the calculation result of the calculated network reliability between the terminal and the adjacent node in each of the domains to the inter-network reliability calculation unit 1. The inter-network reliability calculation unit 1 calculates the reliability of the network between adjacent nodes when the adjacent nodes are contracted. Finally, the inter-network reliability calculation unit 1 uses expression (11) to calculate a range (an upper limit value and a lower limit value described later) of the reliability of the network between terminals.

In the above example, the same calculation unit (the inter-network reliability calculation unit 1) calculates the reliability between networks between adjacent nodes and the reliability range of the network between terminals. Moreover, if the reliability between networks is also to be concealed, the reliability between networks and a reliability width may be calculated separately (for example, the reliability between networks and a reliability width may be calculated by an inter-network reliability calculation unit and a reliability width calculation unit, respectively), and the network provider may calculate the reliability between networks and the service operator may only calculate the reliability range. Furthermore, in a case where the calculation of the reliability of the network between the terminal and the adjacent node in each domain and the calculation of the reliability of the network between adjacent nodes are shared, the intra-network reliability calculation unit 2 may encrypt the calculation result before transmission to the inter-network reliability calculation unit 1.

The calculation result of the reliability range may be provided to a user, and the service provider may calculate a fee for providing a service on the basis of the reliability range, or may use the reliability range as an index for selecting a network. The calculation result may also be reflected in a design algorithm of the network and used for planning an increase or decrease in the number of links and nodes.

Furthermore, in transmitting the calculation result of the reliability within the network, each of the intra-network reliability calculation units 2 may also transmit a usage fee of the network and a delay amount of the network to the inter-network reliability calculation unit 1. The inter-network reliability calculation unit 1 may sum and present the fee and the delay amount of each network to the user, together with the result of the reliability estimation.

Figure 4:
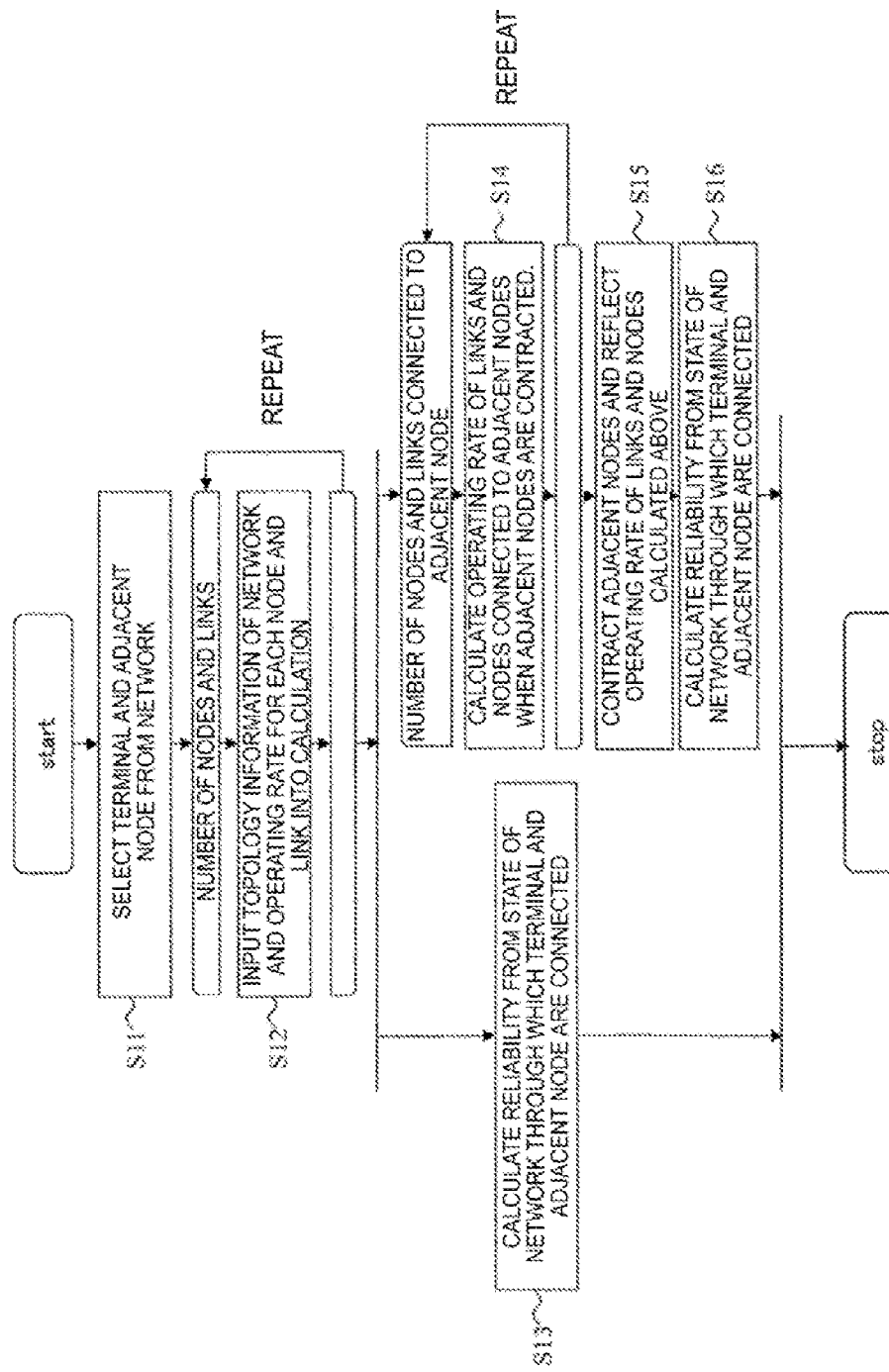
FIG. 4 is a flow chart for describing an operation of an intra-network reliability calculation unit of the reliability estimation system according to the present invention.

FIG. 4 is a flow chart for describing a calculation of a reliability between a terminal and an adjacent node in each domain, performed by the intra-network reliability calculation unit 2. A network provider selects a terminal T and an adjacent node B (step S11). The graph G of equation (1) is created from a node V and a link E in a network, and information about an operating rate is input to each node and link (step S12). The operating rate may be previously registered in a database by an operator, the operating rate may be calculated from a past failure history and the like, or the operating rate may be calculated by calculating the probability of failure from a strain measurement of an optical fiber, log information of a terminal, and the like. The intra-network reliability calculation unit 2 calculates the reliability of the network between the terminal and the adjacent node in each domain from the number of subgraphs between the terminal and the adjacent node, by equations (4) (step S13).

The intra-network reliability calculation unit 2 calculates, subsequently or in parallel, the reliability within the network when adjacent nodes are contracted.

In a case where a plurality of the adjacent nodes are connected to the same terminal or the same node via a link, when the adjacent nodes are contracted, the operating rate of the link between the node and the terminal or between the nodes after the contraction is obtained by combining the operating rates of the links before the contraction. When the operating rate changes by the contraction of the nodes and links, the intra-network reliability calculation unit 2 calculates the operating rate (step S14). For example, the intra-network reliability calculation unit 2 checks whether a node connected to the adjacent node to be contracted is the same, and, if the node is the same, calculates the link and the operating rate obtained when the nodes are contracted. Subsequently, the intra-network reliability calculation unit 2 performs a contraction process of the adjacent nodes and reflects the operating rate calculated above in the operating rate after the contraction (step S15). Finally, the intra-network reliability calculation unit 2 calculates the reliability within the network after the contraction of the adjacent nodes in each domain from the number of subgraphs between the terminal and the contracted adjacent node, by equations (4) (step S16).

As described above, the intra-network reliability calculation unit 2 obtains the reliability $$R(G[V_i],(T \cup B) \cap V_i)$$

within the network when the adjacent nodes are not contracted and the reliability $$R(G'[V_i'],(T \cup B') \cap V_i')$$

R within the network when the adjacent nodes are contracted.

Figure 5:
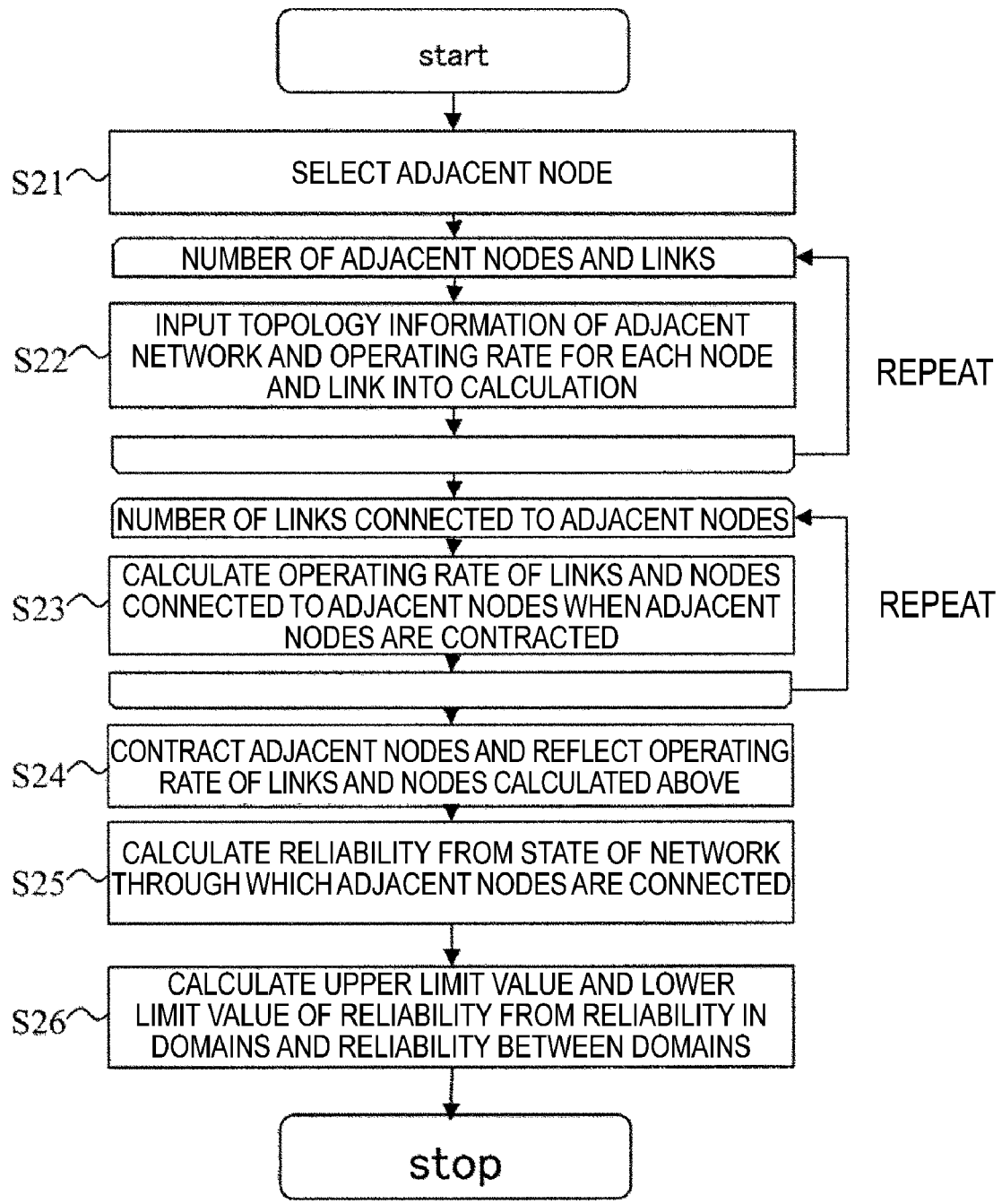
FIG. 5 is a flow chart for describing an operation of an inter-network reliability calculation unit of the reliability estimation system according to the present invention.

FIG. 5 is a flow chart for describing a calculation of a reliability between adjacent nodes, performed by the inter-network reliability calculation unit 1.

The network provider inputs a combination of the adjacent node B and the link E between the adjacent nodes and information about the operating rate of the link and the node into the graph G[B] of equations (3) (steps S21 and S22). The operating rate of the link and the node may be determined as in the description of the intra-network reliability calculation unit 2. Information about adjacent nodes and the link after the contraction of the nodes may be provided to the service provider, to perform calculation only for a case where the nodes are contracted.

The inter-network reliability calculation unit 1 contracts the adjacent nodes from this graph G[B] to calculate the reliability of the network between the adjacent nodes.

In the calculation method, the inter-network reliability calculation unit 1 calculates the operating rate of the links and nodes, if the operating rate changes when adjacent nodes are contracted, as in the description for the intra-network reliability calculation unit 2 (step S23), contracts the adjacent nodes, and reflects the calculated operating rate of the links and nodes (step S24). Next, the inter-network reliability calculation unit 1 calculates the reliability of a network between adjacent nodes from a subgraph between the adjacent nodes (step S25).

Finally, the inter-network reliability calculation unit 1 uses expression (12) to calculate a width of a range of the network reliability from the calculation result of the reliability of the network between the terminal and the adjacent node in the domain and the calculation result of the reliability of the network between the adjacent nodes between networks (step S26).

When the nodes and links pass through the same infrastructure (such as the same operator, the same tunnel, the same power system, the same transmission device, the same building, and buildings in a close distance) so that the nodes and links may simultaneously suffer from a disaster, the inter-network reliability calculation unit 1 may add the probability that the nodes and links simultaneously fail, to information about the links and nodes. When there is a portion having a high risk of being attacked by others, the inter-network reliability calculation unit 1 may calculate the reliability by adding the risk to the failure rate as a security risk.

Furthermore, the inter-network reliability calculation unit 1 may reduce a time for calculating the network reliability by a combination with existing binary decision diagrams (BDD) and zero-suppressed decision diagrams (ZDD) when these are equivalent in the calculation of the network reliability.

EXAMPLE

Figure 6:
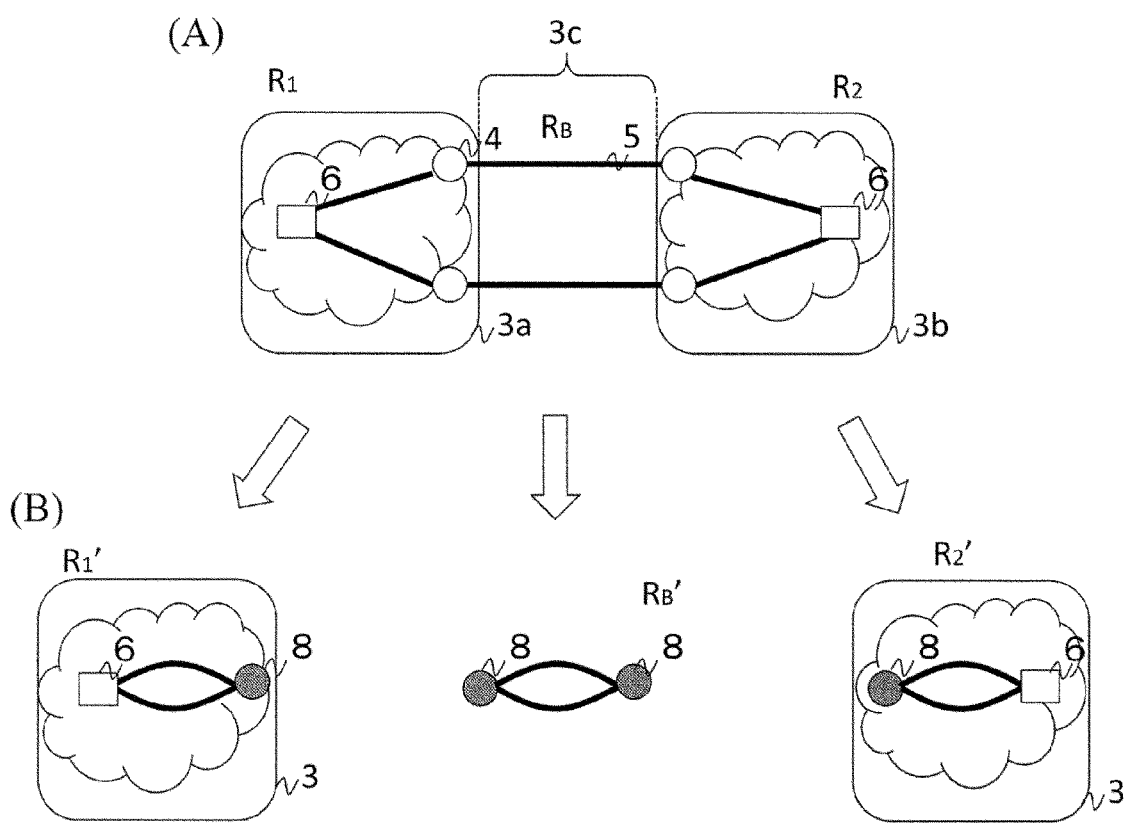
FIG. 6 is a diagram for describing a non-contracted state and a contracted state.

FIG. 6 is a diagram for describing a calculation example in the reliability estimation system of the present embodiment. FIG. 7 is a graph for describing a calculation result. FIG. 6(A) is a diagram for describing a given network configuration. It is assumed that $R_1$ is the reliability of a network 3a on the left, $R_2$ is the reliability of a network 3b on the right, and $R_B$ is the reliability of a network 3c between adjacent nodes. FIG. 6(B) is a diagram for describing each network configuration when the adjacent nodes are contracted (contracted adjacent nodes 8). It is assumed that $R_1'$ is the reliability of the network 3a when the adjacent nodes are contracted, $R_2'$ is the reliability of the network 3b when the adjacent nodes are contracted, and $R_B'$ is the reliability of the network 3c when the adjacent nodes are contracted. In this case, expression (12) is represented by the following expression.

[Math. 13]

$$R_B'R_1R_2 < R < R_B'R_1'R_2' \qquad (13)$$

FIG. 7 is a graph in which a result of expression (13) is plotted with the operating rate of the link on the horizontal axis and the reliability on the vertical axis. FIG. 7 proves that the reliability R(G, T) of the network is situated between the left side and the right side of FIG. 13. Thus, a range of the reliability of the network between terminals can be calculated by determining the left side and the right side of equation (13) (that is, equation (12)). The number of terminals is not limited to one for each domain, and similar calculation can be performed in a case of one-to-many and a case of many-to-many.

Second Embodiment

In recent years, in software-defined WAN (SD-WAN), there is a technique in which a plurality of networks having low quality are combined to enable communication having a good real-time property. However, a numerical value of the reliability of a network can be known only from a specification. Thus, the reliability of the network between terminals may be dynamically calculated according to the technique described in the present embodiment, and a flow may be distributed to each application on a terminal side.

Figure 8:
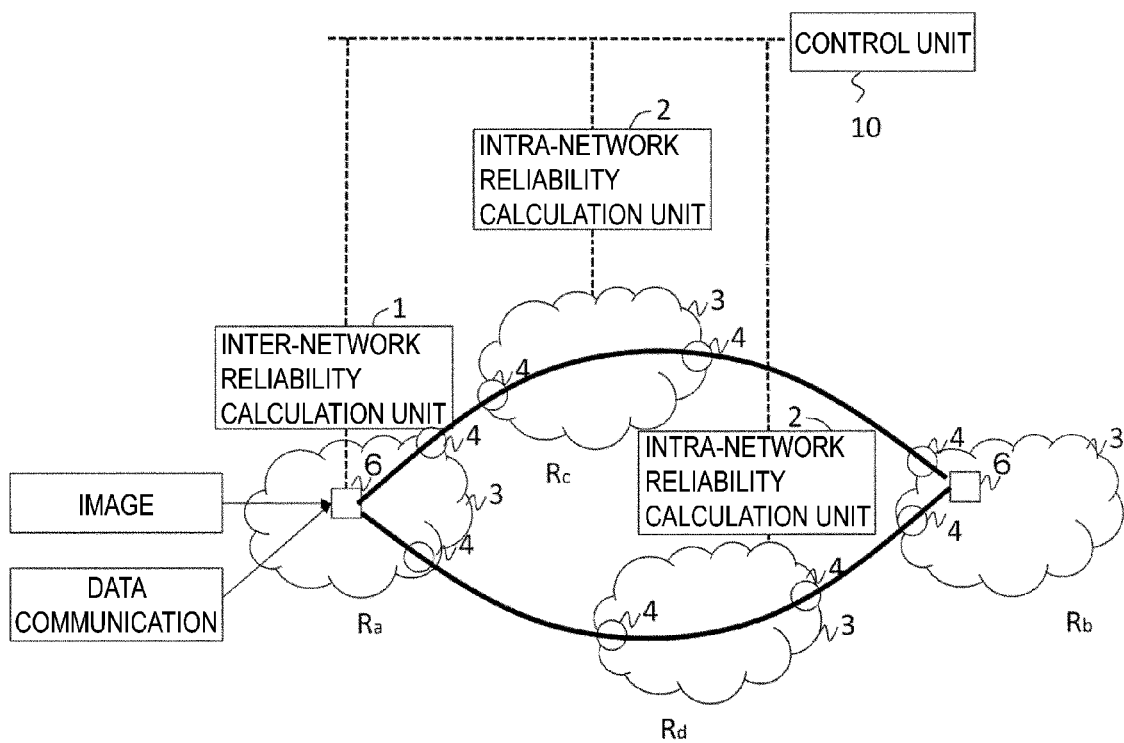
FIG. 8 is a diagram for describing a reliability estimation system according to the present invention.

FIG. 8 is a diagram for describing a network configuration of the present embodiment. Each of the terminals 6 requests the intra-network reliability calculation unit 2 and the inter-network reliability calculation unit 1 to calculate the reliability. The requested intra-network reliability calculation unit 2 and inter-network reliability calculation unit 1 calculate a range of the reliability between terminals and transmit the calculation result to the terminal 6. From the calculation result, the terminal 6 determines which path is to be used for transmitting applications and distributes and transfers the applications to and through each path.

Normally, in a case where real time communication is required, the reliability of a line is unknown, and thus, a surplus of buffer amount is provided, but the increased buffer results in increase in delay. Thus, in the technique of the present embodiment, the reliability is calculated dynamically to change a buffer of an application and optimize a buffer amount. For example, in the case of a network in which a certain amount of packets are lacked, a buffer size T is given by the following equation.

[Math. 14]
$$T = \frac{(K \times h + \gamma \times h) \times S}{R} \quad (14)$$

where K, h, γ, S, and R respectively indicate the number of packets, the number of successfully transferred packets, the number of retransmitted packets, the packet size, and the transfer rate. If the operating rate of the network between terminals is known, the buffer amount can be estimated.

Specifically, the reliability estimation system of the present embodiment further includes a control unit 10 that causes the intra-network reliability calculation unit 2 and the inter-network reliability calculation unit 1 to calculate the product P1 and the product P2 and sets a buffer size satisfying a required quality of an application to a node on a path of the application.

Figure 9:
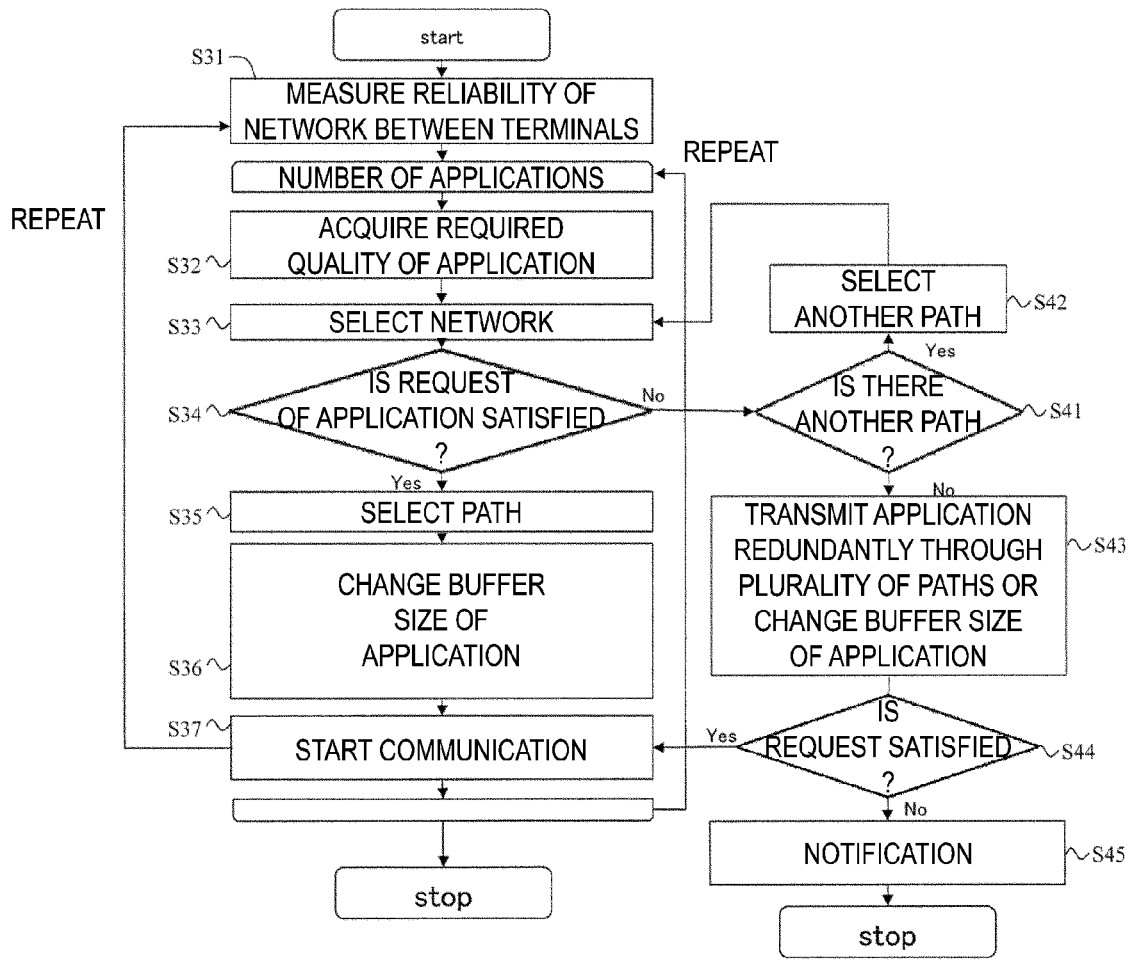
FIG. 9 is a flow chart for describing a reliability estimation method according to the present invention.

FIG. 9 is a flow chart for describing an operation of the reliability estimation system of the present embodiment. The terminal 6 including the reliability estimation system may perform the operation of FIG. 9.

The reliability estimation system estimates the reliability of the network by the method described in the first embodiment (step S31). Next, the reliability estimation system acquires the required quality for each application and selects a network (steps S32 and S33). When the network satisfies the request for an application ("Yes" in step S34), the reliability estimation system selects a path of the network (step S35) and optimizes the buffer size in accordance with the reliability of the path to perform communication (steps S36 and S37). Even after the start of communication, the reliability estimation system can respond to dynamic changes by repeating the estimation of the network reliability.

If the network does not satisfy the request of the application ("No" in step S34), the reliability estimation system selects another path and checks again whether the path satisfies the request of the application (steps S41, S42, S33, and S34). If there is no path that satisfies the request of the application ("No" in step S41), the reliability estimation system examines whether the request can be satisfied by using a plurality of paths in a redundant manner for transmission or increasing the buffer amount of the application (steps S43 and S44). If the request is satisfied ("Yes" in step S44), the reliability estimation system performs communication in this configuration. If the request is not satisfied ("No" in step S44), the reliability estimation system notifies a user (step S45). The reliability estimation system may calculate the buffer amount from the request level of the application and the reliability of the path.

Third Embodiment

In addition to the reliability calculation of the reliability estimation system described in the first embodiment, the reliability estimation system of the present embodiment may calculate and comprehensively determine a delay, a usage rate, a utilization fee of the network, and the like to select a path. Specifically, in the reliability estimation system of the present embodiment, the intra-network reliability calculation unit further calculates at least one of a delay, a fee, and a utilization rate within a network for each state of the plurality of networks, the inter-network reliability calculation unit further calculates at least one of a delay, a fee, and a utilization rate between the plurality of networks, and calculates a delay, a fee, and a utilization rate between the terminals in accordance with the result calculated by the intra-network reliability calculation unit, and a control unit that determines whether the delay, the fee, and the utilization rate between the terminals satisfy a predetermined required value is further provided.

Figure 10:
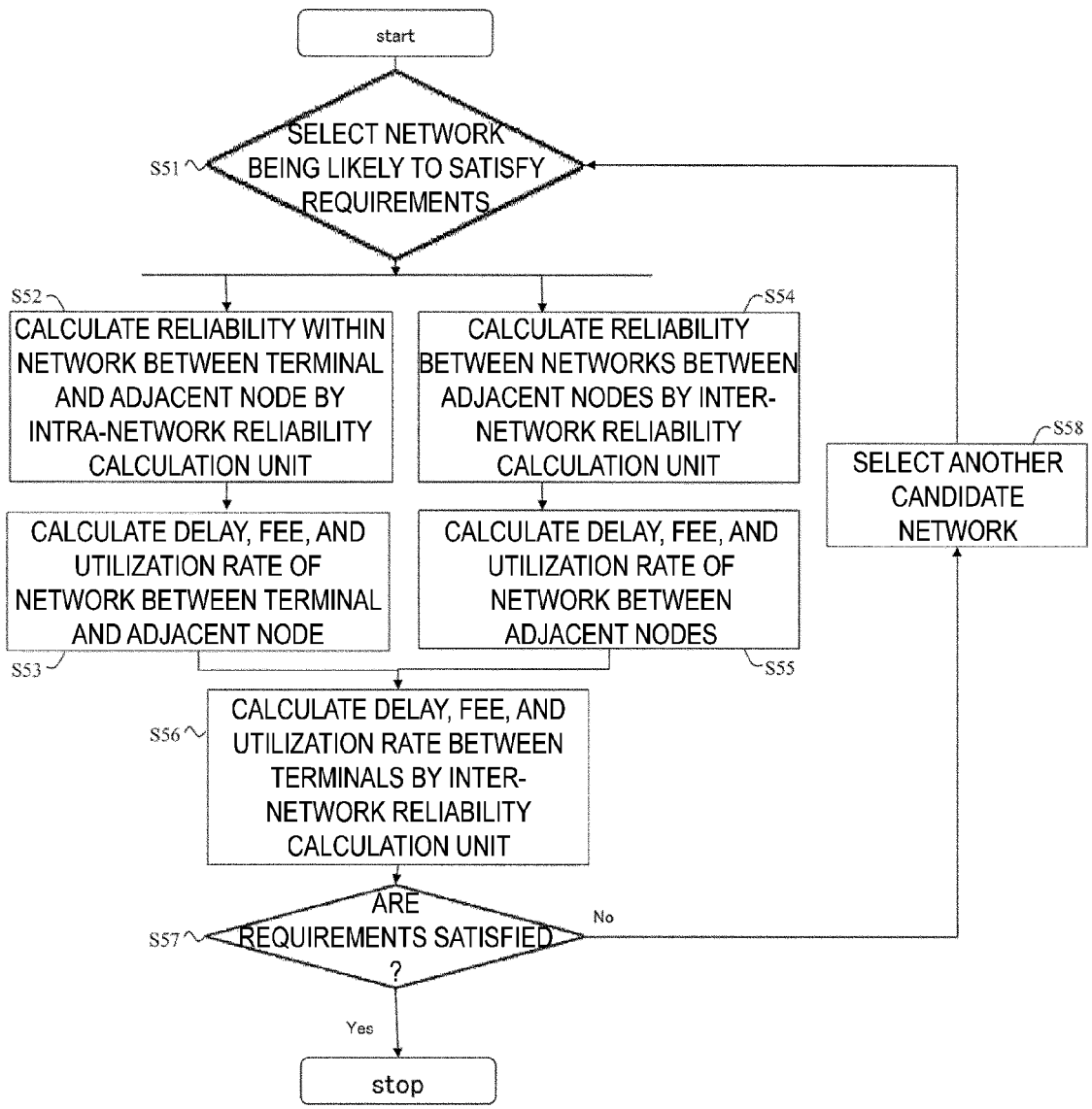
FIG. 10 is a flow chart for describing a reliability estimation method according to the present invention.

FIG. 10 is a flow chart for describing an operation of the reliability estimation system of the present embodiment.

First, the reliability estimation system selects a network that is likely to satisfy requirements for a reliability, a delay, a usage rate, a utilization fee of the network, and the like (step S51). The intra-network reliability calculation unit 2 calculates the reliability within the network as described in the first embodiment (step S52). In addition to the operating rates of the links and nodes, information such as the delay, fee, and usage rate is also input to the graph G. The intra-network reliability calculation unit 2 calculates the probability of realizing a subgraph, and simultaneously also sums and calculates a delay, a bandwidth usage amount (utilization rate), and the like between the terminal and the adjacent node (step S53).

On the other hand, the inter-network reliability calculation unit 1 also calculates, in a similar manner, the graph G to calculate the reliability between the networks, and simultaneously sums and calculates a delay, a fee, a bandwidth usage amount (utilization rate), and the like between the terminal and the adjacent node (steps S54 and S55). Further, the inter-network reliability calculation unit 1 calculates a delay, a fee, and a utilization rate between terminals (step S56).

Note that "comprehensively determine" means that the reliability estimation system selects a network as follows. For example, when a delay of the nodes and links, an amount of available bandwidth, a utilization fee, and other information are input as information about the nodes and links of the network, the reliability estimation system calculates the reliability from a graph of a network through which the terminals are connected (steps S52 and S54).

Simultaneously, the reliability estimation system also calculates a range of a delay of the subgraph between terminals, an amount of available bandwidth, and a width of a utilization fee (steps S53 and S55). The reliability estimation system may apply a weight to the reliability, the delay, the available capacity, and the utilization fee obtained by the calculation, and solve an objective function to determine whether the network satisfies the requirements (steps S56 and S57). Furthermore, the reliability estimation system may first calculate the reliability calculation to search for a network that satisfies the requirements for a delay, an available capacity, and a utilization fee in a range satisfying the requirement of the reliability.

When the network does not satisfy the requirements including the reliability, the delay, the usage rate, and the utilization fee of the network, the inter-network reliability calculation unit 1 calculates again the reliability of another candidate network, to find a network satisfying the requirements (steps S57 and S58).

Additional Description

The following describes the reliability estimation system of the present embodiment.

An object of the present reliability estimation system is to suppress an increase of the calculation amount in calculating the reliability of a network.

To achieve the above object, a network reliability range calculation system according to the present invention is characterized in that an intra-network reliability calculation unit calculates a reliability within a network for each of management networks corresponding to the intra-network reliability calculation unit, an inter-network reliability calculation unit calculates a reliability between networks when adjacent nodes are contracted, and the network reliability range calculation system uses the reliability within each network calculated by the intra-network reliability calculation unit and the reliability between the networks when the adjacent nodes are contracted, calculated by the inter-network reliability calculation unit, to calculate a reliability range of a network to be measured.

Specifically, the network reliability range calculation system according to the present invention is characterized in including
the intra-network reliability calculation unit configured to calculate a network reliability between adjacent nodes connecting a terminal and a network or between the adjacent node and an adjacent node,
the inter-network reliability calculation unit configured to calculate a reliability between networks when adjacent nodes are contracted, and
the intra-network reliability calculation unit and the inter-network reliability calculation unit.

Furthermore, the network reliability estimation system according to the present invention is characterized in that the intra-network reliability calculation unit has a function of calculating a reliability within a network when adjacent nodes are contracted. Thus, it is possible to calculate a range from an upper limit value to a lower limit value of the reliability of a network between domains.

A reliability estimation program according to the present invention is a program causing a computer to function as the network reliability estimation system including intra-network reliability calculation means for receiving an operating rate and configuration information of nodes and links within a network and outputting a network reliability between a terminal and an adjacent node or between the adjacent node and an adjacent node, and inter-network reliability calculation means for receiving an operating rate and configuration information of adjacent nodes and links between networks and outputting a reliability between networks when the adjacent nodes are contracted.

The network reliability estimation system according to the present invention can suppress a calculation amount when a reliability of a network between terminals is estimated.

REFERENCE SIGNS LIST

1: Inter-network reliability calculation unit
2: Intra-network reliability calculation unit
3, 3a, 3b, 3c: Network
4: Adjacent node
5: Link
6: Terminal
7: Calculation result exchange unit
8: Contracted adjacent node
10: Control unit

The invention claimed is:

1. A reliability estimation system for estimating a reliability of communication between terminals in different networks, the system comprising
a processor; and
a non-transitory storage medium having computer program instructions stored thereon, when executed by the processor, perform to:
when the communication involves two or more paths passing through a plurality of networks,
calculates a non-contraction reliability $R_x$ within a network for each of the plurality of networks, and
calculates a contraction reliability $R_x'$ within a network when nodes are contracted in the network in which paths are separated and merged, among the plurality of networks,
calculates a contraction reliability $R_B'$ between the networks including the terminals when nodes are contracted in the networks including the terminals, among the plurality of networks,
receives, from the intra-network reliability calculation unit, the non-contraction reliability $R_x$ and the contraction reliability $R_x'$ to calculate a product P1 of the contraction reliability $R_B'$ and all of the non-contraction reliabilities $R_x$ and to calculate a product P2 of the contraction reliability $R_B'$ and all of the contraction reliabilities $R_x'$.

2. The reliability estimation system according to claim 1, wherein the computer program instructions further perform to
calculate the product P1 and the product P2; and
sets a size of a buffer satisfying a required quality of an application to a node on a path of the application.

3. The reliability estimation system according to claim 1, wherein the computer program instructions further perform to, when none of the paths satisfies a required quality of an application,
sets a path for the application which is obtained by redundantly combining a plurality of the paths.

4. The reliability estimation system according to claim 1, wherein the computer program instructions further perform to, when none of the paths satisfies a required quality of an application,
increases a size of a buffer on the paths; and
sets a path for the application which is satisfying the required quality of the application among the paths.

5. The reliability estimation system according to claim 1, wherein the computer program instructions further perform to, calculates at least one of a delay, a fee, and a utilization rate within a network for each state of the plurality of networks, further calculates at least one of a delay, a fee, and a utilization rate between the plurality of networks, and calculates a delay, a fee, and a utilization rate between the terminals, and determines whether the delay, the fee, and the utilization rate between the terminals satisfy a predetermined required value.

6. A reliability estimation method for estimating a reliability of communication between terminals in different networks, the method comprising:

when the communication involves two or more paths passing through a plurality of networks, calculating a non-contraction reliability $R_x$ within a network for each of the plurality of networks;

calculating a contraction reliability $R_x'$ within a network when nodes are contracted in the network in which paths are separated and merged, among the plurality of networks;

calculating a contraction reliability $R_B'$ between the networks including the terminals when nodes are contracted in the networks including the terminals, among the plurality of networks;

calculating a product P1 of the contraction reliability $R_B'$ and all the plurality of non-contraction reliabilities $R_x$ and a product P2 of the contraction reliability $R_B'$ and all the plurality of contraction reliabilities $R_x'$; and estimating that a true value of the reliability of communication between the terminals is between the product P1 and the product P2.

7. The reliability estimation method of claim 6 further comprises setting a size of a buffer satisfying a required quality of an application to a node on a path of the application.

8. The reliability estimation method of claim 6 further comprises setting a path for the application which is obtained by redundantly combining a plurality of the paths when none of the paths satisfies a required quality of an application.

9. The reliability estimation method of claim 6 further comprises, when none of the paths satisfies a required quality of an application, increasing a size of a buffer on the paths; and setting a path for the application which is satisfying the required quality of the application among the paths.

10. The reliability estimation method of claim 6 further comprises calculating at least one of a delay, a fee, and a utilization rate within a network for each state of the plurality of networks;

calculating at least one of a delay, a fee, and a utilization rate between the plurality of networks, and calculating a delay, a fee, and a utilization rate between the terminals, and determining whether the delay, the fee, and the utilization rate between the terminals satisfy a predetermined required value.

* * * * *